United States Patent [19]

Wilcox

[11] 4,187,913

[45] Feb. 12, 1980

[54] FIREHOSE-ASSEMBLY STEADYING DEVICE

[75] Inventor: Dwight E. Wilcox, Omaha, Nebr.

[73] Assignee: Wilcox Silent Nozzle Man, Inc., Omaha, Nebr.

[21] Appl. No.: 899,063

[22] Filed: Apr. 24, 1978

Related U.S. Application Data

[63] Continuation-in-part of Ser. No. 791,785, Apr. 28, 1977, abandoned.

[51] Int. Cl.[2] .......................... A62C 33/04; F16L 5/00

[52] U.S. Cl. .......................................... 169/51; 239/282; 248/75; 285/162; 285/320

[58] Field of Search ........................ 239/273, 282, 283; 169/51; 248/56, 57, 75, 76, 201; 285/162, 320

[56] References Cited

U.S. PATENT DOCUMENTS 1,476,810 12/1923 Gilsenan .......................... 239/282 X 3,079,937 3/1963 Tooper et al. .................... 239/282 X

FOREIGN PATENT DOCUMENTS 505642 8/1930 Fed. Rep. of Germany ........... 239/283

*Primary Examiner*—Robert B. Reeves
*Assistant Examiner*—Andres Kashnikow
*Attorney, Agent, or Firm*—George R. Nimmer

[57] ABSTRACT

The steadying device of the present invention is for conveniently stably physically maintaining the firehose-assembly with minimal or no manpower ancillary to firemanship tasks such as fighting fires, evacuating smoke, etc. For example, the steadying device permits the firehose-assembly nozzle to be strategically located and thereafter steadily maintained at a building wall opening solely by virtue of waterstream backpressure exerted through the steadying device winged portion and hence without fireman holding assistance during smoke evacuation periods.

13 Claims, 7 Drawing Figures

FIG. 1
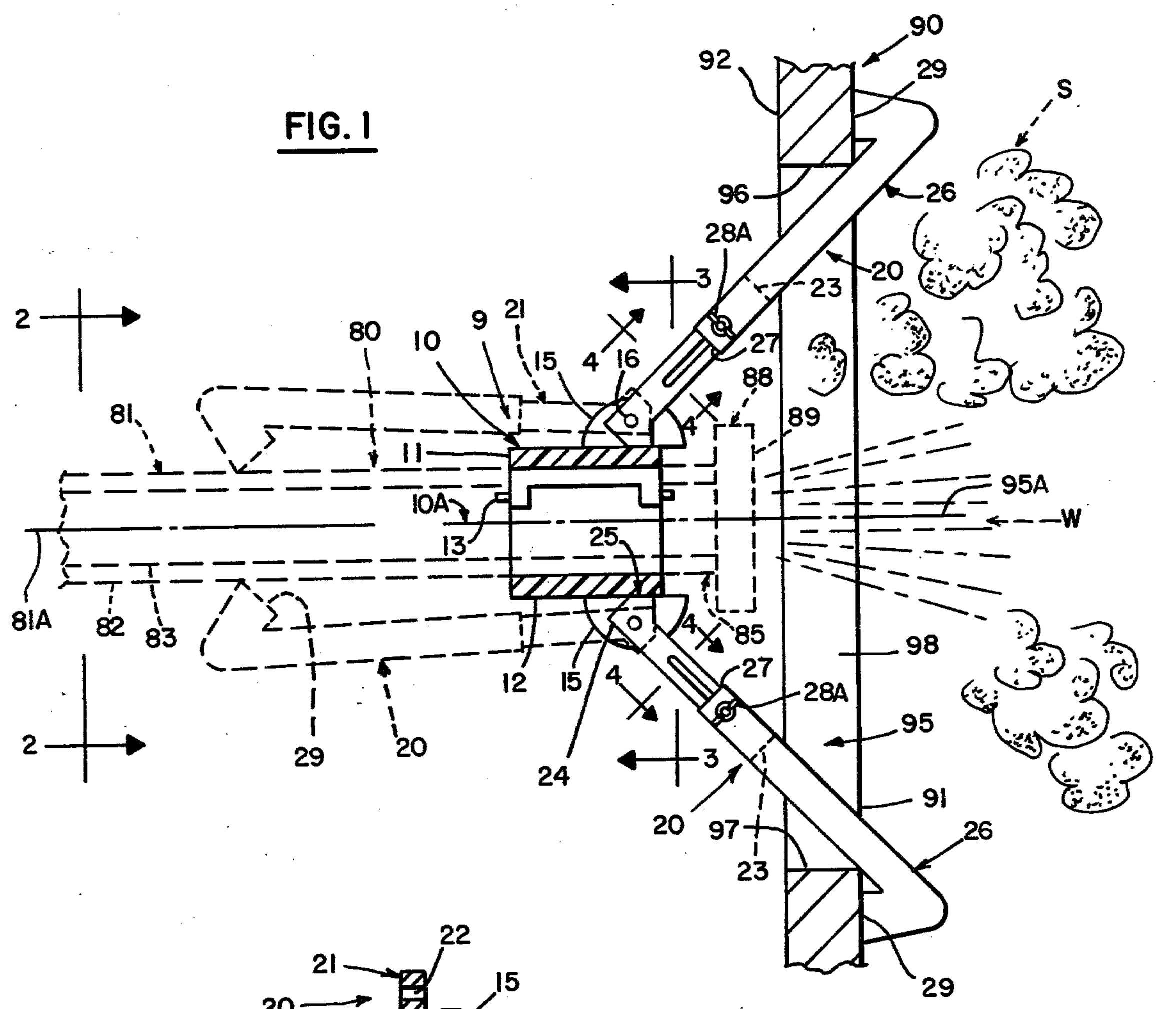
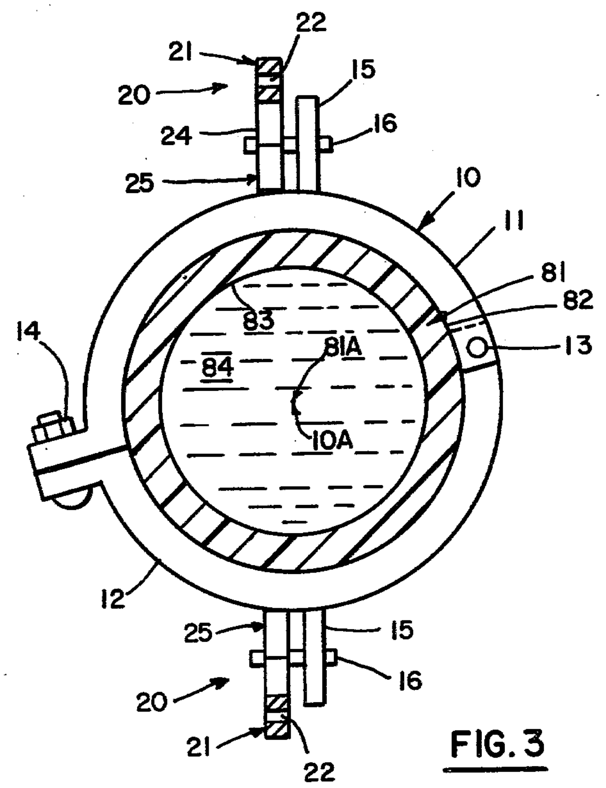
FIG. 3
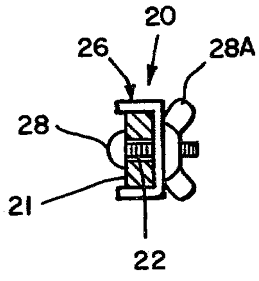
FIG. 4

FIREHOSE-ASSEMBLY STEADYING DEVICE

Attendant and prior to this patent application, I have filed U.S. Pat. application Ser. No. 791,785 (filed Apr. 28, 1977), non abandoned and the instant application is a continuation-in-part thereof.

Ancillary to building fires, smoke damage to the building interior oftentimes exceeds the monetary damage of the actual burning or charring of the building interior contents. Consequently, prudent firemanship practice includes the prompt evacuation of smoke from the buiding interior immediately following the extinguishing of flaming and smoldering fires. During latter stages of extinguishing fires inside buildings, firemen carrying several feet of the firehose nozzled end and themselves physically located inside the building, will break a window pane or otherwise make a wall opening whereby smoke might be exhausted externally to the outdoors.

To hasten smoke exhaust and thus minimize smoke damage, mechanical centrifugal fans are sometimes employed adjacent the wall opening. For similar purpose, the firehose-assembly nozzle at a "fogging" waterstream condition might be directed through the wall opening, the waterstream pressure coincidentally inducing smoke draft externally through the wall opening. However, because of the considerable waterstream backpressure, this smoke evacuation technique requires that one or two firemen remain standing within the smoke-filled building to foreceably maintain the firehose-assembly nozzle part strategically at the wall opening, this procedure being not only costly in terms of manpower but also subjecting the firemen to smoke inhalation during the prolonged period needed for smoke evacuation.

It is accordingly the general object of the present invention to provide a firehose-assembly steadying device that will maintain the waterstream nozzle strategically located at the wall opening of a smoke-filled building and indefinitely steadied thereat solely by virtue of waterstream backpressure and without continual reliance upon manual holding during the smoke evacuation period. Ancillary general objectives include: providing a firehose-assembly steadying device that can be emplanted very quickly and reliably at the wall opening eventhough the firemen are laboring under smoke obscured visual conditions, that does not require separate tools and parts apart from the steadying device itself, and that is amenable to various shapes and sizes of wall openings.

With the above and other objects and advantages in view, which will become more apparent as this description proceeds, the firehose-assembly steadying device of the present invention generally comprises: an upright collar surrounding a collar-axis colinear with the hose-axis and the collar securely located rearwardly of the nozzle front-end; at least one and preferably a plurality of elongate wings associated with the collar, each wing being movable between an inoperative ready-condition and an operative abutment-condition, the wing at ready-condition lying generally parallel to the firehose leadwardlength, each wing at abutment-condition having a far-end positioned remotely radially outwardly the collar for abutment against the wall external surface adjacent the wall opening; and forwardstop means extending from the wing to the collar to prevent the wing far-end at abutment-condition from being moved rearwardly and thereby remaining effective so long as waterstream backpressure tends to force the firehose leadward-length and the secured winged collar in the rearward direction.

In the drawing, wherein like characters refer to like parts in the several views, and in which:

FIG. 1 is a side elevational view of a representative embodiment of the firehose-assembly steadying device of the present invention, shown in removable physical combination with the nozzled firehose at the opening of a building wall. Phantom lines indicate the firehose-assembly, and the steadying device wings at ready-condition;

FIG. 3 is a sectional elevational view taken along line 3—3 of FIG. 1;

FIG. 4 is a sectional elevational view taken along line 4—4 of FIG. 1;

Figure 2:
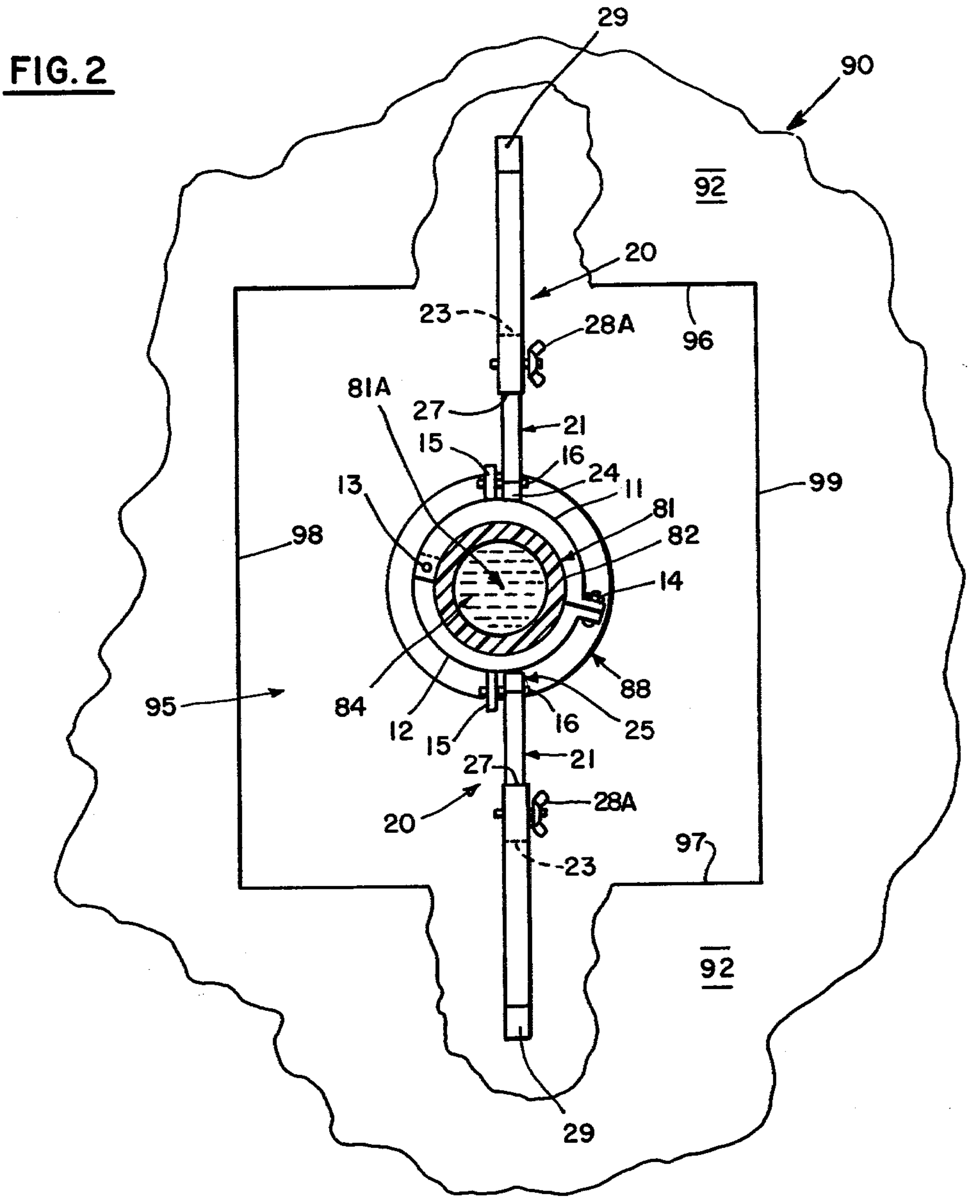
FIG. 2 is a sectional elevational view taken along line 2—2 of FIG. 1.
Figure 5:
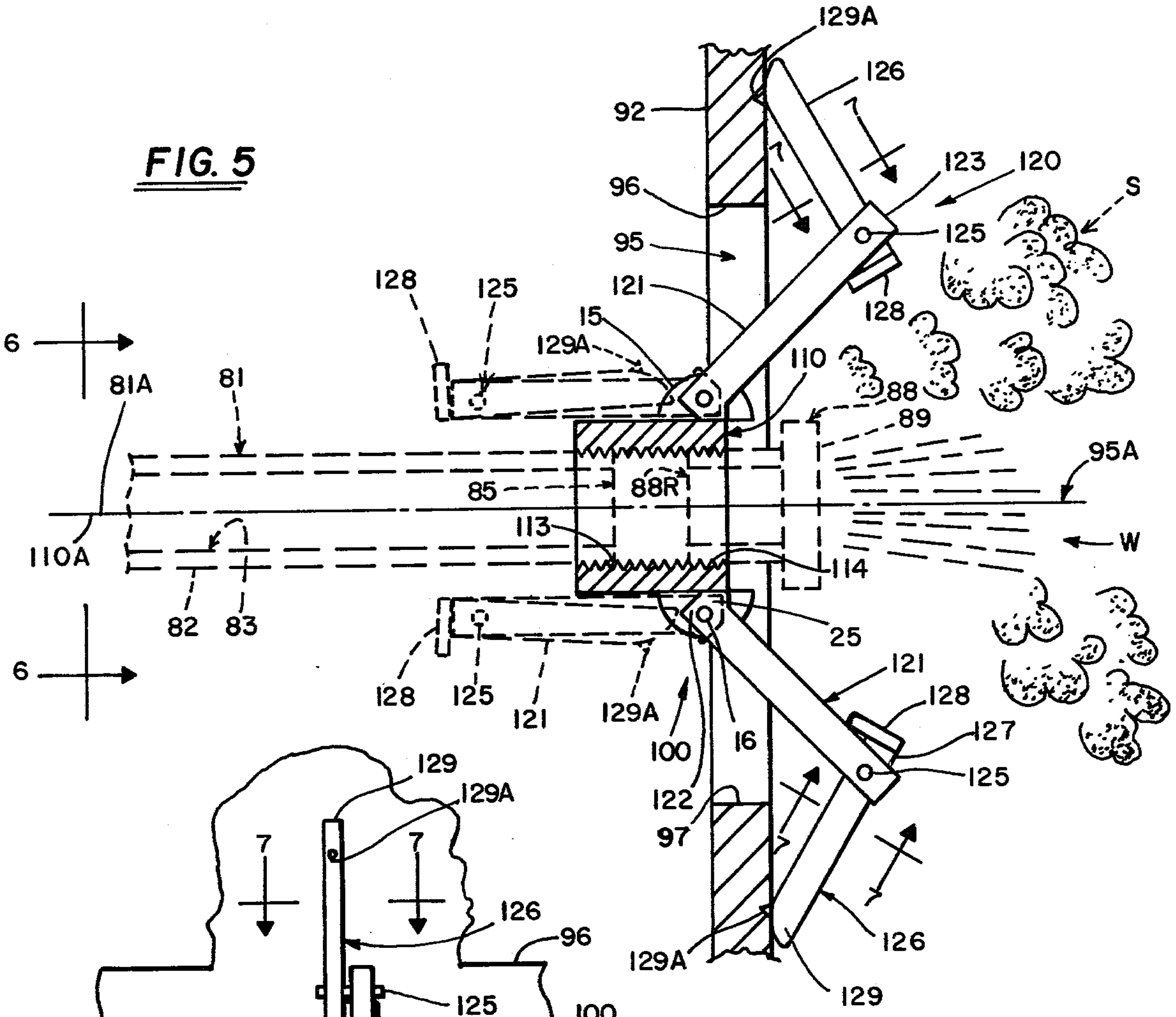
FIG. 5 is a side elevational view analagous to FIG. 1 showing an alternate embodiment steadying device.
Figure 6:
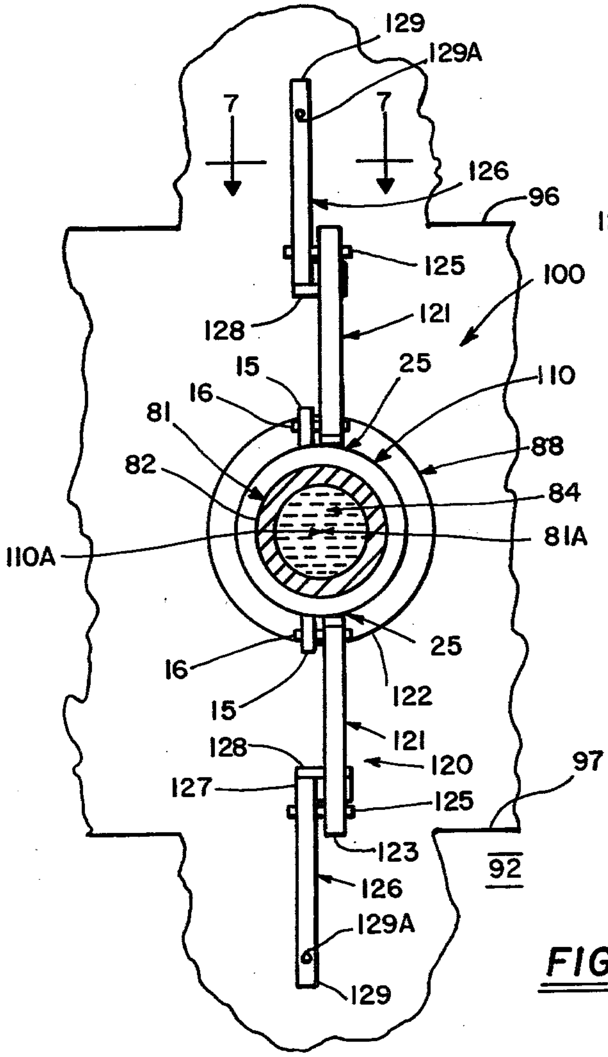
Figure 7:
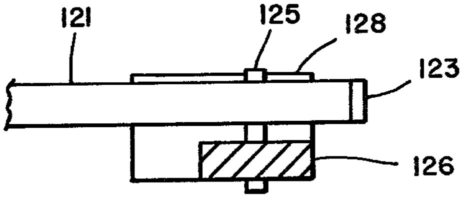

FIG. 6 is a sectional elevational view analagous to FIG. 2 taken along line 6—6 of FIG. 5; and FIG. 7 is a sectional view taken along lines 7—7 of FIGS. 5 and 6.

FIGS. 1 and 2 indicate a representative building wall 90 including a rearward interior-surface 92 at the building smoke-filled interior and a wall forward external-surface 91. Wall 90 is herein shown with a rectangular window or other opening 95 with its perimeter 96–99 surrounding vent-axis 95A. A firehose-assembly 80, comprising the firehose leadward-length 81 surrounding hose-axis 81A and with a nozzle 88 connected at the firehose lead-end 85, is conventionally utilized to draft smoke "S" directionally forwardly through opening 95. As is known in the prior art, firehose-assembly 80 is most aptly employed for drafting smoke when the hose-axis 81A is substantially colinear with vent-axis 95A, with the nozzle 88 set to provide a fog-type waterstream "W" from hose water 84. Moreover, the nozzle front-side 89 (from which the waterstream "W" directionally forwardly emerges) is preferably located a few inches of the vent 95. In the prior art, the firehose-assembly 80 is maintained in such smoke drafting position by one or two firemen, two persons being better because of the appreciable rearward backpressure to firehose 81 exerted by the directionally forward waterstream "W". However, with the steadying device concept e.g. 9, 100, of the present invention, such manpower is not required.

Steadying device embodiment 9 of the present invention comprises a collar 10 secured to the firehose-assembly and surrounding a collar-axis 10A co-linear with hose-axis 81A, and a plurality of wings (herein two such wings as 20) permanently associated at respective collar-stations and which wings lie alongside the firehose leadward-length outside-wall 82 when the device (9, 100) is at ready-condition as indicated in FIGS. 1 and 5 phantom line. However, as shown in FIGS. 1 and 5 solid lines, the wings (20, 120) at abutment-condition abuttably terminate (29, 129) at the building wall external-surface 91 ancillary to evacuating smoke "S". Considering the waterstream "W" backpressure force, the device necessarily includes forwardstop means e.g. 25, to maintain the wing markedly oblique to collar-axes 10a and 110A at abutment-condition, rather than collapsed toward axes 81A, 95A, 10A, and 110A.

For device embodiment 9, collar 10 securely surrounds the leadward-length of firehose 81 immediately rearwardly hose lead-end 85, and is desireably removably secured thereto. The collar 10 depicted in FIGS. 1–3 comprises two semi-circular parts 11 and 12 hingedly joined at 13, the respective parts 11 and 12 being flanged and being held in removably secured surrounding condition to firehose outside-wall 82 with mechanical means e.g. bolts 14. The respective collar-stations 15 for the respective wings (20, 120) are spaced angularly about hose-axis 81A at not greater than 180° increments, thus ensuring ultimate abutting stability (e.g. 29, 129) at the wall opening 95. Preferably, the collar-stations 15 and the wings (20, 120) are regularly angularly spaced about the collar-axes 10A or 110A, for example, two wings at 180°, four wings at 90°, etc. However, collars provided with but a single wing have some limited utility in that the smoke evacuation task might be accomplished by a lone fireman.

Each wing has two ends including a near-end e.g. 24, 122, and a far-end e.g. 29, 129, the latter intended for abutment with the wall external-surface 91 when the wing is at abutment-condition. The respective wings are best permanently, though movably, secured with respect to the firehose. Thus, the wings might remain with and be carried about with the firehose; yet, for smoke evacuation, each wing is radially moved from the ready-condition to oblique abutment-condition. As herein depicted, each of the wings (20, 120) is pivotably permanently secured at its near-end (24,122) to its own collar-station boss 15 of the collar (10, 110) with a pivot-pin 16.

Preferred wings comprise a pair of movably associated, though arrestable, segments including a near-length (e.g. 21, 121) and a far-length (e.g. 26, 126). For example, in order to accommodate various wall-opening sizes (e.g. perimeter 96–99), it is desireable that one or more of the wings be of selectively extendable length between near-end (24) and far-end (29). With embodiment 9, each wing 20 comprises two slidably associated elongate lineal portions including near-length segment 21 (with terminii 24 and 23) and far-length segment 26 (with terminii 27 and 29). As indicated in FIG. 4, wing near-length segment 21 might be of rectangular cross-sectional shape and provided with a slotted portion 22. However, near-length 21 at wing near-end 24 is aptly provided with a right-angled toe 25 adapted to bear against collar 10 at abutment-condition thus functioning as forwardstop means. The near-length segment 121 of embodiment 100 has an identical toe 25 for bearing against collar 110 as forwardstop means. Far-length 26, aside from far-end 29, is shown of C-shaped cross-section slidably associated with near-length 21 as an angularity arresting means. Far-length 26 near its terminus 27 carries a bolt 28 passing therethrough and through slot 22, bolt 28 being provided with a wingnut 28A. Thus, the selected extended length of far-length 26 from near-length 21 might be indefinitely maintained e.g. lengthwise arrested, by the wingnut 28A.

Although having already been alluded to, operation of the firehose-assembly steadying device embodiment 9 might be summarized as follows. While internally (92) the smoke-filled building, firemen carry the firehose-assembly nozzled (88) end toward opening 95 as the wings (20) are in ready-condition alongside the firehose (81) leadwardlength as indicated in FIG. 1 phantom line. Then, with the nozzle (88) "off" whereby waterstream "W" is absent, the firemen pass the nozzle parallel to vent-axis 95A until collar 10 is positioned slightly forwardly the wall external-surface 91. Next, after having estimated the perimeter size (96–99), the fireman selectes and arrests (at 28A) the wing overall length from near-end 24 to far-end 29. At this time, he then pivots wings 20 at pivot-point 16 and moves the far-ends 29 away from the firehose 81. Finally, the fireman turns nozzle 88 to "on" (preferably as fogstream "W") whereby the resultant backpressure of waterstream "W" causes wings far-ends 29 to impinge and set against wall external-surface 91, said abutment-condition being maintained by the forwardstop means 25 and waterstream ("W") backpressure, as indicated in FIG. 1 solid line. After the smoke "S" is thus finally exhausted, the fireman returns to the scene and re-sets nozzle 88 to "off" whereby waterstream "W" is extinguished. In reverse stepwise order the wings ready-condition is once again effected.

Steadying device embodiment 100 differs from embodiment 9 in two primary respects. First, tubular collar 110 intervenes as an internally threaded removable connector, providing a distinct finite gap between firehose lead-end 85 and nozzle trail-end 88R. Secondly, wings 120 are of fixed length between near-end 122 and far-end 129, though the wing elongate segments 121 and 126 are angularly movable e.g. at pivot-point 125, but of arrestable angularity e.g. at ear 128 of far-length 126. Thus, it will be seen that operation of embodiment 100 differs from that for embodiment 9 only in that it is unnecessary to perform that method step recited in the fourth sentence of the immediately preceeding paragraph.

Tubular collar 110 of embodiment 100 surrounds collar-axis 110A and has an annular front-side 114 to removably engage nozzle trail-end 88R and an annular threaded rear-side 113 to removably engage firehose lead-end 85. Collar 100 is provided with upright boss 15 collar-stations (having pivot-pins 16 for wing near-end 122) located at regular angular spacings about collar-axis 110A.

The two elongate lineal segments 121 and 126 of each wing 120 are pivotably associated as at 125, rather than being slidably associated as are the wings 20 for embodiment 9. Specifically, far-length segment 126 is pivotably attached with pivot-pin 125 to near-length segment 121 remote from near-end 122. Pivot-pin 125 is at a position remote from the far-length far end 129, which is additionally provided with a pointed stud 129A for more secure engagement with the wall external-surface 91. The inter-segments arresting means, to maintain the abutment-condition shown in solid line, herein comprises an ear 128 attached to the terminus 127 of far-length 126 and which ear 128 bears against the near-length terminal portion 123. As previously alluded to, the said abutment-condition will remain by virtue of the waterstream "W" backpressure exerted against collar 110 and thence therefrom to stops 25 and 128. Of course, analagous stops 25 and 128 might be readily designed for analagous purpose.

The wings 120 ready-condition parallel to axis 110A is indicated in FIG. 5 phantom line. To re-attain this ready-condition following smoke-evacuation and extinguishing waterstream "W", hose 85 is moved forwardly whereby wings far-end 129-129A moves forwardly away wall external-surface 91. Then, referring to the upper wing of FIG. 5, near-length 121 and far-length 126 are pivoted counterclockwise about pivot-pins 16 and 125, respectively, whereby both segments 121 and 126 which are of comparable lengths lie alongside hose 85 rearwardly of collar rear-side 113. The rearwardly collapsed dual-segments wings at ready-condition might be held securely against firehose 85 with suitable girth band means (not shown) attachable to the wings themselves. Such girth bands make possible non-interfering use of the firehose-assembly 80, until such time as the wings (20,120) might be readily erected ancillary smoke evacuation tasks.

From the foregoing, the construction and operation of the firehose-assembly steadying devices will be readily understood and further explanation is believed to be unnecessary. However, since numerous modifications and changes will readily occur to those skilled in the art, it is not desired to limit the invention to the exact constructions shown and described, and accordingly, all suitable modifications and equivalents may be resorted to, falling within the scope of the appended claims.

I claim:

1. In combination with the leadward portion of a firehose-assembly including a firehose tubularly surrounding a hose-axis and a nozzle for the directionally forward emission of a waterstream from the nozzle front-side, a firehose-assembly steadying device adapted to constructionally employ waterstream backpressure for stably maintaining the nozzle aptly located at a wall opening for the intended firemanship task, said steadying device comprising:

A. collar means surrounding the hose-axis and secured to the firehose-assembly rearwardly of the nozzle front-side;

B. a plurality of elongate wings associated with the collar means and each wing having a near-end and a far-end, each wing having an inoperative ready-condition and an operative abutment-condition, each wing at ready-condition lying generally parallel to the hose-axis whereby the near-end and the far-end are alongside the firehose leadward-length, each wing at abutment-condition being markedly oblique the hose-axis and having its near-end at the collar means and its far-end positioned remotely radially outwardly from the collar means, and at least one of said wings comprising a pair of movably associated elongate segments including a near-length terminating at the wing near-end and a far-length extending to the wing far-end, there being movement arresting means to temporarily maintain the selected spatial relationship between the near-length and far-length segments; and C. forwardstop means to prevent the wing at abutment-conditon from being moved toward the firehose, said forwardstop means actuatably extending from the wing nearward portion to the collar means and thereat remaining effective so long as waterstream backpressure tends to force the firehose-assembly and the secured collar means in the rearward direction.

2. The combination of claim 1 wherein there is a plurality of said wings regularly angularly spaced about the hose-axis and permanently pivotably attached to the collar means.

3. In combination with the leadward portion of a firehose-assembly including a firehose tubularly surrounding a hose-axis and a nozzle for directionally forward emission of a waterstream from the nozzle front-side, a firehose-assembly steadying device adapted by virtue of said waterstream backpressure to maintain the firehose leadward-length near the opening of a wall having a forward external-surface and maintaining the nozzle aptly located to induce smoke draft forwardly through said wall opening, said steadying device comprising:

A. an upright collar surrounding a collar-axis and which collar-axis is superimposable along the firehose-axis, said collar being attached to the firehose-assembly rearwardly of the nozzle frontside;

B. at least one elongate wing permanently attached with the collar at a distinct collar-station and having a near-end and a far-end, each wing being movable at its collar-station from an inoperative ready-condition which is substantially parallel to the firehose leadward-length to an operative abutment-condition, the wing at abutment-condition being markedly oblique to the hose-axis with its near-end at its collar-station and with its far-end positioned remotely radially outwardly the collar and near-end for abutment against the wall external-surface adjacent said opening; and C. forwardstop means to prevent the wing at abutment-condition condition from being moved toward the firehose, said forwardstop means actuatably extending from the wing nearward portion to the collar means and thereat remaining effective so long as waterstream backpressure tends to force the firehose-assembly and the secured collar means in the rearward direction.

4. The combination of claim 3 wherein the near-end of each wing is pivotably attached to a collar-station and thereby having a longitudinally fixed location with respect the hose-axis.

5. The combination of claim 4 wherein there is a plurality of said wings; and wherein the collar-stations are regularly angularly spaced about the collar-axis.

6. The combination of claim 5 wherein the nozzle front-side is locatable by the wings far-ends rearwardly of the wall interior-surface, each of said wings being forwardly pivotal from its collar-station commencing from ready-condition to assume said forwardstopped abutment-condition.

7. The combination of claim 6 wherein at least one of said wings is of slidably selectable length between near-end and far-end, there being arresting means to maintain each selected wing length.

8. The combination of claim 3 wherein the collar intervenes as a threaded connector between the firehose lead-end and the nozzle trail-end.

9. The combination of claim 8 wherein at least one of said wings comprises a pair of movably associated elongate segments including a near-length terminating at the wing near-end and a far-length extending to the wing far-end, there being inter-segments arresting means to temporarily maintain the selected spatial relationship between near-length and far-length segments.

10. The combination of claim 9 wherein the near-length segment remote of its near-end is pivotably attached to the far-length segment remote of its far-end, the far-length segment at its far-end being provided with a pointed stud for abutment against the wall external-surface.

11. A steadying device adapted for removable combination with the leadward portion of a firehose-assembly including a firehose tubularly surrounding a hose-axis and a nozzle for directionally forward emission of a waterstream from the nozzle front-side, said steadying device comprising:

A. a tubular collar having an annular front-side provided with threads for removable connection to a nozzle trail-end and having an annular rear-side provided with threads for removable connection to the firehose lead-end, said collar and annular terminii surrounding a collar-axis;

B. at least one elongate wing permanently attached to the collar at a distinct collar-station and having a near-end and a far-end, each wing being movable at its collar-station from an inoperative ready-condition which is substantially parallel the collar-axis to an operative abutment-condition, the wing at abutment-condition being markedly oblique to the collar-axis with its near-end at its collar-station and with its far-end positioned remotely radially outwardly from the collar and the wing near-end; and C. forwardstop means actuatably extending from the wing near-end to the collar to prevent the wing at abutment-condition from being moved rearwardly.

12. The steadying device of claim 11 wherein at least one wing comprises a pair of movably associated elongate segments including a near-length and a far-length, there being inter-segments arresting means to maintain the selected spatial relationship therebetween.

13. The steadying device of claim 12 wherein there is a plurality of said wings regularly angularly spaced about the collar-axis and pivotably attached to the collar at an upright boss collar-station.

* * * * *